(12) United States Patent
Mamtimin et al.

(10) Patent No.: US 11,493,662 B2
(45) Date of Patent: Nov. 8, 2022

(54) DETERMINING DENSITY OF MULTIPLE LAYERS USING GAMMA SPECTROSCOPY

(71) Applicant: Halliburton Energy Services, Inc., Houston, TX (US)

(72) Inventors: Mayir Mamtimin, Spring, TX (US); Jeffrey James Crawford, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 279 days.

(21) Appl. No.: 16/886,519

(22) Filed: May 28, 2020

(65) Prior Publication Data

US 2021/0373194 A1 Dec. 2, 2021

(51) Int. Cl.
*G01V 5/12* (2006.01)
*E21B 49/00* (2006.01)
(Continued)

(52) U.S. Cl.
CPC .............. *G01V 5/12* (2013.01); *E21B 47/005* (2020.05); *E21B 49/00* (2013.01); *E21B 47/26* (2020.05)

(58) Field of Classification Search
CPC ........ E21B 47/005; E21B 47/26; E21B 49/00; G01V 5/12
See application file for complete search history.

(56) References Cited

U.S. PATENT DOCUMENTS 5,451,779 A * 9/1995 Spross .................... G01V 5/125
250/269.1
7,292,942 B2 11/2007 Ellis et al.
(Continued)

FOREIGN PATENT DOCUMENTS

| CN | 203161209 | 8/2013 |
|---|---|---|
| WO | 2018-164694 | 9/2018 |

OTHER PUBLICATIONS

International Search Report and Written Opinion for Application No. PCT/US2020/036441, dated Feb. 24, 2021.
(Continued)

*Primary Examiner* — Mark R Gaworecki
(74) *Attorney, Agent, or Firm* — John Wustenberg; C. Tumey Law Group PLLC

(57) ABSTRACT

A nuclear density tool may comprise a gamma source, a gamma detector, wherein the gamma detector and the gamma source are disposed on a longitudinal axis of the nuclear density tool, and a housing, wherein the gamma source and the gamma detector are disposed in the housing. The nuclear density tool may further comprise a first cutout in the housing positioned to allow the gamma source to emit an energy through the housing and a second cutout in the housing posited to allow the gamma detector to detect the energy through the housing. A method for determining a density may comprise disposing a nuclear density tool into a wellbore, transmitting an energy from the gamma source, detecting the energy reflected with the gamma detector, recording a count rate of the energy at the gamma detector, determining an average density based at least in part on the count rate, creating one or more layers from the average density, forming a layer construction using at least in part the one or more layers from the average density, comparing the layer construction to count rates form individual energy channels, and determining a final layer density for each of the one or more layers.

20 Claims, 4 Drawing Sheets

(51) Int. Cl.
  *E21B 47/00* (2012.01)
  *E21B 47/005* (2012.01)
  *E21B 47/26* (2012.01)

(56) References Cited

U.S. PATENT DOCUMENTS

| | | |
|---|---|---|
| 9,322,949 B2 | 4/2016 | Mosse et al. |
| 2013/0124103 A1 | 5/2013 | Mabie et al. |
| 2014/0052376 A1 | 2/2014 | Guo et al. |
| 2018/0180763 A1 | 6/2018 | Zhang et al. |
| 2018/0292204 A1 | 10/2018 | Lee et al. |
| 2019/0094410 A1 | 3/2019 | Mendez et al. |
| 2019/0265384 A1 | 8/2019 | Jurczyk et al. |
| 2021/0048548 A1 | 2/2021 | Chang et al. |

OTHER PUBLICATIONS

U.S. Appl. No. 15/565,132, filed Oct. 6, 2017.
"Density profile unfolding from Compton scattering measurements in reflection geometry" by J.E.F., M. B., A.G., and V.S., X-ray Spectrum. 2007; 36: 20-26.
"A new approach to determining compensated density and Pe values with a spectral density tool", by G.L. Moake 1991 SPWLA.

\* cited by examiner

DETERMINING DENSITY OF MULTIPLE LAYERS USING GAMMA SPECTROSCOPY

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

During the lifetime of the well the integrity of the cement, casing string, production tubing, and formation may be examined through one or more measurements. These measurements may be performed by a nuclear density tool. Existing nuclear density tools measure a bulk density of a single layer averaged over the depth of investigation, providing little information as to the variation in density as a function of radial distance from the sensor. Current density tools use the contrast between a near and far detector to apply a borehole correction to the density measured by the far detector. Usually the correction requires knowledge of the borehole environment, such as borehole size, standoff, and borehole fluid composition and density. Additionally, existing nuclear density tools and calculation algorithms are designed to extract only a bulk density of the surrounding material averaging over the sampling range/thickness, therefore, lacking the ability to resolve any intrinsic differences in individual annular layers within that volume.

BRIEF DESCRIPTION OF THE DRAWINGS

These drawings illustrate certain aspects of some examples of the present disclosure and should not be used to limit or define the disclosure.

DETAILED DESCRIPTION

This disclosure may generally relate to systems and methods to measure the densities of individual annular layers within a depth of investigation using a nuclear density tool. This ability may be used in a cased-hole environment for cement evaluation since the individual cement layer(s) may be isolated. Additionally, methods and system may be used in an open-hole environment to determine formation density under normal conditions, in the presence of washouts or other conditions of large or non-uniform standoff, and when shallow invasion is present. Methods and system employ an optimized geometry to directly compute the densities of the various layers independently.

As discussed below, systems and methods disclosed may utilize a combination of radioactive gamma sources and multiple gamma detectors to measure densities of multiple annular layers. This nuclear density tool may include an optimized source-to-detector configuration to enhance the spectral sensitivities to multiple layers. Additionally, the method includes an analytical method based at least in part on a multiple Compton scattering scheme of high-energy photons. The methodology and algorithm is developed using multiple major energy channels representing the main Compton scattering angles. In the disclosed method, a detector count rate is a combined function of multiple layer densities. An inverse function of detector count rate was found to resolve layer densities using multiple energy channels from multiple detectors.

Figure 1:
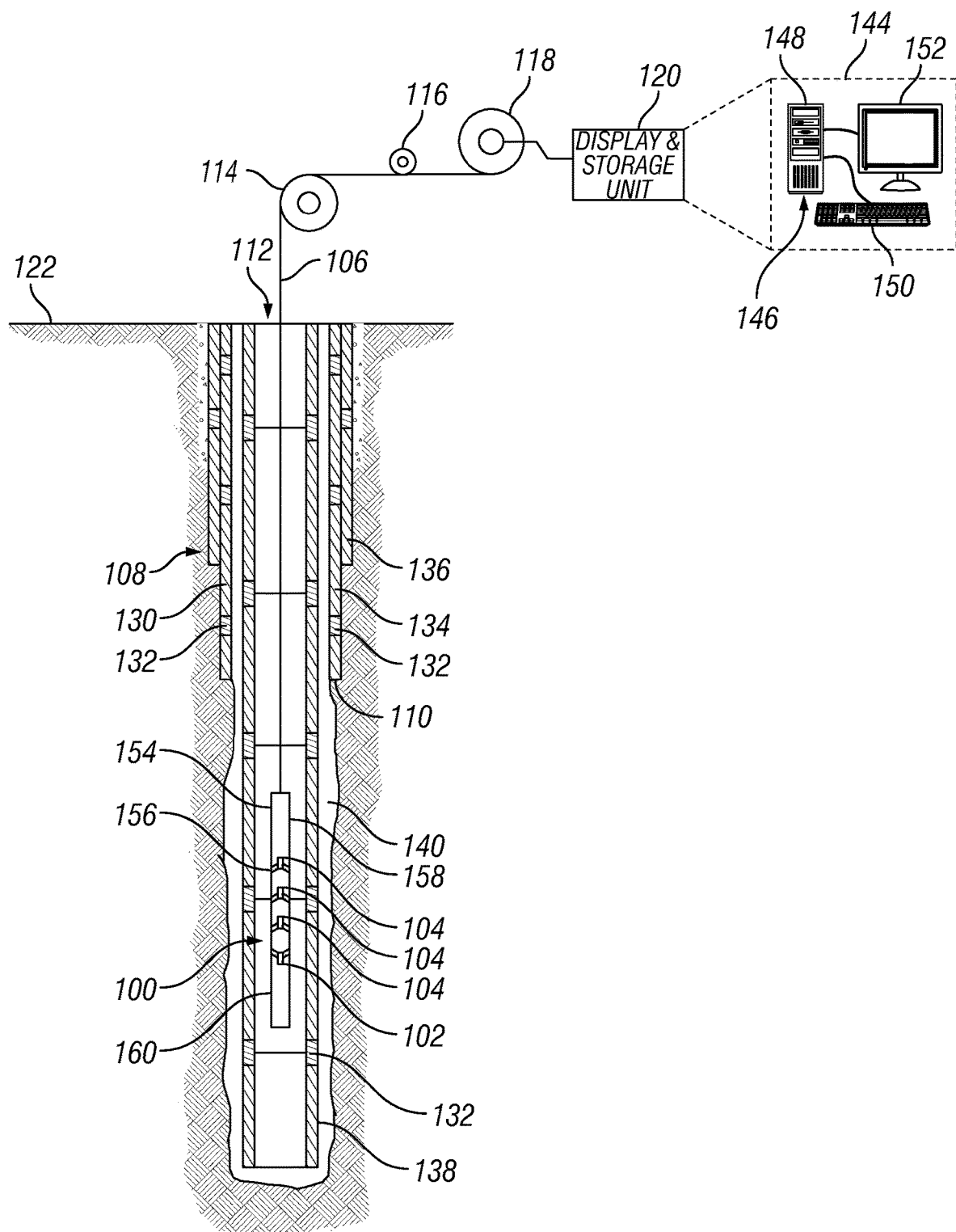
FIG. 1 illustrates an example of a nuclear density tool.

FIG. 1 illustrates an example operating environment for a nuclear density tool 100 as disclosed herein. Nuclear density tool 100 may comprise a gamma source 102 and/or a gamma detector 104. In examples, there may be any number of gamma sources 102 and/or any number of gamma detectors 104, which may be disposed on nuclear density tool 100. In examples, gamma sources 102 may be Cs-137 and Co-60 sources. However, any type of gamma source 102 may be used, such as, x-ray sources, chemical radioactive sources, or accelerator-based high energy photon source. Gamma detectors 104 may include a medium to absorb gamma energy and electronics to convert that energy to a measurable signal. Gamma absorbing medium turns the absorbed energy to either a scintillation light or an electrical signal. Gamma detectors 104 may measure the energy of the gamma and its incoming rate.

Nuclear density tool 100 may be operatively coupled to a conveyance 106 (e.g., wireline, slickline, coiled tubing, pipe, downhole tractor, and/or the like) which may provide mechanical suspension, as well as electrical connectivity, for nuclear density tool 100. Conveyance 106 and nuclear density tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in wellbore 110. Signals recorded by nuclear density tool 100 may be stored on memory and then processed by display and storage unit 120 after recovery of nuclear density tool 100 from wellbore 110. Alternatively, signals recorded by nuclear density tool 100 may be conducted to display and storage unit 120 by way of conveyance 106. Display and storage unit 120 may process the signals, and the information contained therein may be displayed for an operator to observe and stored for future processing and reference. Alternatively, signals may be processed downhole prior to receipt by display and storage unit 120 or both downhole and at surface 122, for example, by display and storage unit 120. Display and storage unit 120 may also contain an apparatus for supplying control signals and power to nuclear density tool 100. Typical casing string 108 may extend from wellhead 112 at or above ground level to a selected depth within wellbore 110. Casing string 108 may comprise a plurality of joints 130 or segments of casing string 108, each joint 130 being connected to the adjacent segments by a collar 132. There may be any number of layers in casing string 108. For example, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. Nuclear density tool 100 may be dimensioned so that it may be lowered into the wellbore 110 through pipe string 138, thus avoiding the difficulty and expense associated with pulling pipe string 138 out of wellbore 110. In examples, cement 140 may be disposed on the outside of pipe string 138. Cement 140 may further be disposed between pipe string 138 and casing string 108. It should be noted that cement 140 may be disposed between any number of casings, for example between first casing 134 and second casing 136 (not illustrated).

In logging systems, such as, for example, logging systems utilizing the nuclear density tool 100, a digital telemetry system may be employed, wherein an electrical circuit may be used to both supply power to nuclear density tool 100 and to transfer data between display and storage unit 120 and nuclear density tool 100. A DC voltage may be provided to nuclear density tool 100 by a power supply located above ground level, and data may be coupled to the DC power conductor by a baseband current pulse system. Alternatively, nuclear density tool 100 may be powered by batteries located within the downhole tool assembly, and/or the data provided by nuclear density tool 100 may be stored within the downhole tool assembly, rather than transmitted to the surface during logging.

During logging operations, the operation and function of gamma source 102 and gamma detector 104 may be controlled by display and storage unit 120, which may include an information handling system 144. As illustrated, information handling system 144 may be a component of the display and storage unit 120. Alternatively, information handling system 144 may be a component of acoustic logging tool 100. Information handling system 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, information handling system 144 may be a personal computer, a network storage device, or any other suitable device and may vary in size, shape, performance, functionality, and price. Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with nuclear density tool 100 and/or software executed by processing unit 146. For example, information handling system 144 may enable an operator to select analysis options, view collected log data, view analysis results, and/or perform other tasks. In examples, nuclear density tool 100 and information handling system 144 may be utilized to measure material density in a downhole environment that may surround nuclear density tool 100.

As further illustrated in FIG. 1, nuclear density tool 100 may include a housing 154 which may protect gamma source 102, gamma detector 104, and/or other devices disposed within logging tool 100. Housing 154 may include a material that may prevent the transmission of energy from gamma source 102 or receiving reflected energy by gamma detector 104. In examples, housing 154 may include cut out 156, which may be identified as holes or grooves. Cut outs 156 may be angled and may allow for transmission of energy from gamma source 102 and the sensing/receiving of reflected energy by gamma detector 104. Additionally, gamma source 102 and gamma detector 104 may be disposed in different sub housing or both may be disposed in the same sub housing. For example, gamma source 102 may be disposed in a first sub housing 158 and gamma detector 104 may be disposed in a second sub housing 160. It should be noted that all sub housing may be disposed within housing 154.

As illustrated, one or more gamma detectors 104 may be positioned on nuclear density tool 100 at selected distances (e.g., axial spacing) away from gamma source 102. In examples, gamma source 102 may be disposed above or below the one or more gamma detectors 104. Additionally, gamma source 102 may be dispose with one or more gamma detectors 104 above and one or more gamma detectors 104 below gamma source 102. The axial spacing of gamma detector 104 from gamma source 102 may vary, for example, from about 0 inches (0 cm) to about 40 inches (102 cm) or more. In some embodiments, at least one gamma detector 104 may be placed near the gamma source 102 (e.g., within at least 1 inch (2.5 cm) while one or more additional gamma detectors may be spaced from 1 foot (31 cm) to about 5 feet (152 cm) or more from the gamma source 102. It should be understood that the configuration of nuclear density tool 100 shown on FIG. 1 is merely illustrative and other configurations of nuclear density tool 100 may be used with the present techniques.

Figure 2:
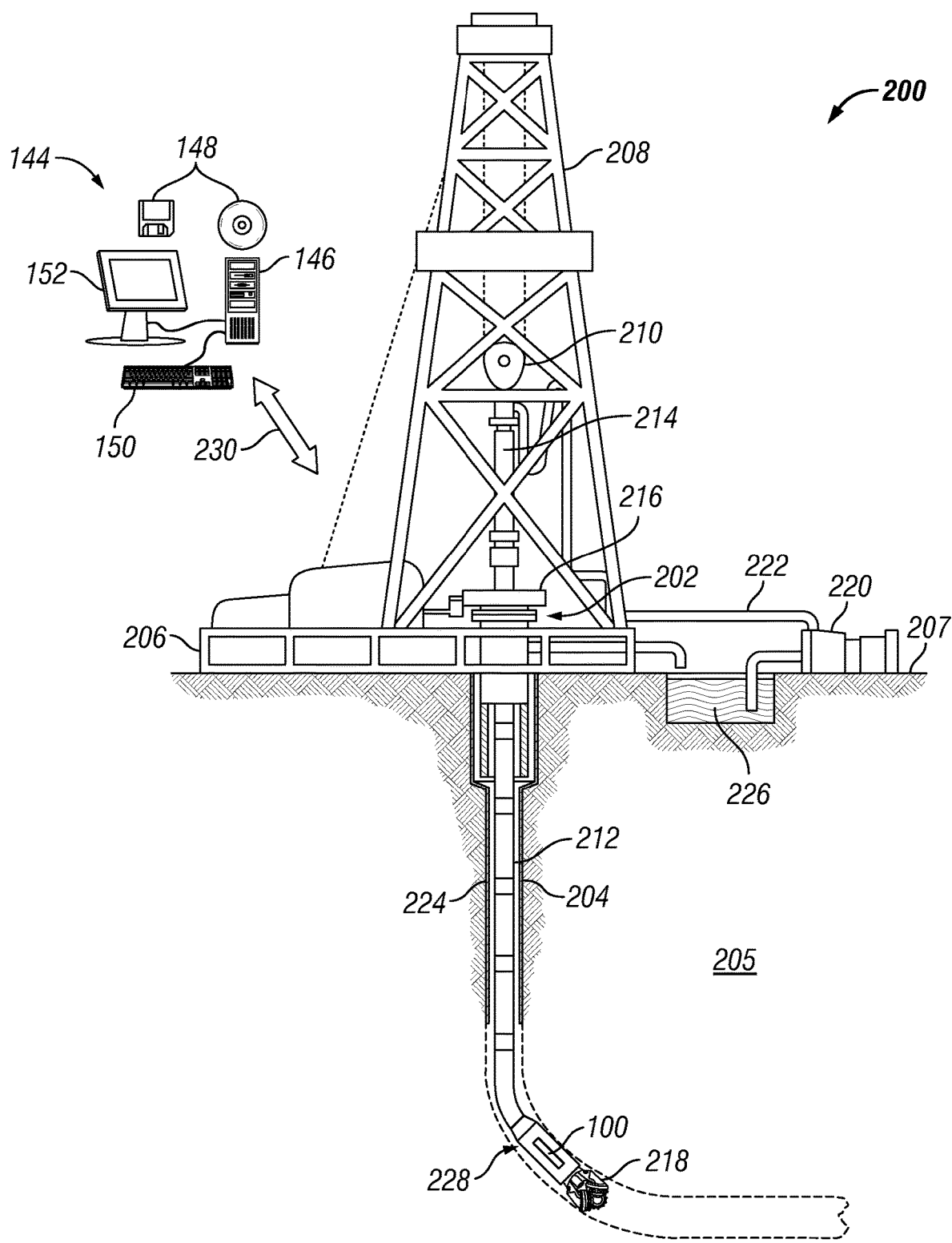
FIG. 2 illustrates another example of the nuclear density tool in a drill operation.

FIG. 2 illustrates an example in which nuclear density tool 100 may be disposed in a drilling system 200. As illustrated, borehole 204 may extend from a wellhead 202 into formation 205 from surface 207. Generally, borehole 204 may include horizontal, vertical, slanted, curved, and other types of borehole geometries and orientations. Imaging tools may be used in uncased sections of the borehole. Measurements may be made by imaging tools in cased sections for purposes such as calibration.

As illustrated, borehole 204 may extend through formation 205. As illustrated in FIG. 2, borehole 204 may extend generally vertically into the formation 205, however borehole 204 may extend at an angle through formation 205, such as horizontal and slanted boreholes. For example, although FIG. 2 illustrates a vertical or low inclination angle well, high inclination angle or horizontal placement of the well and equipment may be possible. It should further be noted that while FIG. 2 generally depicts a land-based operation, those skilled in the art may recognize that the principles described herein are equally applicable to subsea operations that employ floating or sea-based platforms and rigs, without departing from the scope of the disclosure.

As illustrated, a drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 207. Without limitation, drill bit 218 may include, roller cone bits, PDC bits, natural diamond bits, any hole openers, reamers, coring bits, and the like. As drill bit 218 rotates, it may create and extend borehole 204 that penetrates various formations 205. A pump 220 may circulate drilling fluid through a feed pipe 222 to kelly 214, downhole through interior of drill string 212, through orifices in drill bit 218, back to surface 207 via annulus 224 surrounding drill string 212, and into a retention pit 226.

With continued reference to FIG. 2, drill string 212 may begin at wellhead 202 and may traverse borehole 204. Drill bit 218 may be attached to a distal end of drill string 212 and may be driven, for example, either by a downhole motor and/or via rotation of drill string 212 from surface 207 (Referring to FIG. 1). Drill bit 218 may be a part of bottom hole assembly 228 at distal end of drill string 212. Bottom hole assembly 228 may further comprise nuclear density tool 100 (Referring to FIG. 1). Nuclear density tool 100 may be disposed on the outside and/or within bottom hole assembly 228. As will be appreciated by those of ordinary skill in the art, bottom hole assembly 228 may be a measurement-while drilling (MWD) or logging-while-drilling (LWD) system.

Without limitation, bottom hole assembly 228 may be connected to and/or controlled by information handling system 144, which may be disposed on surface 207. Without limitation, information handling system 144 may be disposed down hole in bottom hole assembly 228. Processing of information recorded may occur down hole and/or on surface 207. Processing occurring downhole may be transmitted to surface 207 to be recorded, observed, and/or further analyzed. Additionally, information recorded on information handling system 144 that may be disposed down hole may be stored until bottom hole assembly 228 may be brought to surface 207. In examples, information handling system 144 may communicate with bottom hole assembly 228 through a fiber optic cable (not illustrated) disposed in (or on) drill string 212. In examples, wireless communication may be used to transmit information back and forth between information handling system 144 and bottom hole assembly 228. Information handling system 144 may transmit information to bottom hole assembly 228 and may receive as well as process information recorded by bottom hole assembly 228. In examples, a downhole information handling system (not illustrated) may include, without limitation, a microprocessor or other suitable circuitry, for estimating, receiving and processing signals from bottom hole assembly 228. Downhole information handling system (not illustrated) may further include additional components, such as memory, input/output devices, interfaces, and the like. In examples, while not illustrated, bottom hole assembly 228 may include one or more additional components, such as analog-to-digital converter, filter and amplifier, among others, that may be used to process the measurements of bottom hole assembly 228 before they may be transmitted to surface 207. Alternatively, raw measurements from bottom hole assembly 228 may be transmitted to surface 207.

Any suitable technique may be used for transmitting signals from bottom hole assembly 228 to surface 207, including, but not limited to, wired pipe telemetry, mud-pulse telemetry, acoustic telemetry, and electromagnetic telemetry. While not illustrated, bottom hole assembly 228 may include a telemetry subassembly that may transmit telemetry data to surface 207. Without limitation, an electromagnetic source in the telemetry subassembly may be operable to generate pressure pulses in the drilling fluid that propagate along the fluid stream to surface 207. At surface 207, pressure transducers (not shown) may convert the pressure signal into electrical signals for a digitizer (not illustrated). The digitizer may supply a digital form of the telemetry signals to information handling system 144 via a communication link 230, which may be a wired or wireless link. The telemetry data may be analyzed and processed by information handling system 144.

As illustrated, communication link 230 (which may be wired or wireless, for example) may be provided that may transmit data from bottom hole assembly 228 to an information handling system 144 at surface 207. Information handling system 144 may include a processing unit 146, an output device 152 such as a video display, an input device 150 (e.g., keyboard, mouse, etc.), and/or non-transitory computer-readable media 148 (e.g., optical disks, magnetic disks) that may store code representative of the methods described herein. In addition to, or in place of processing at surface 207, processing may occur downhole.

Figure 3:
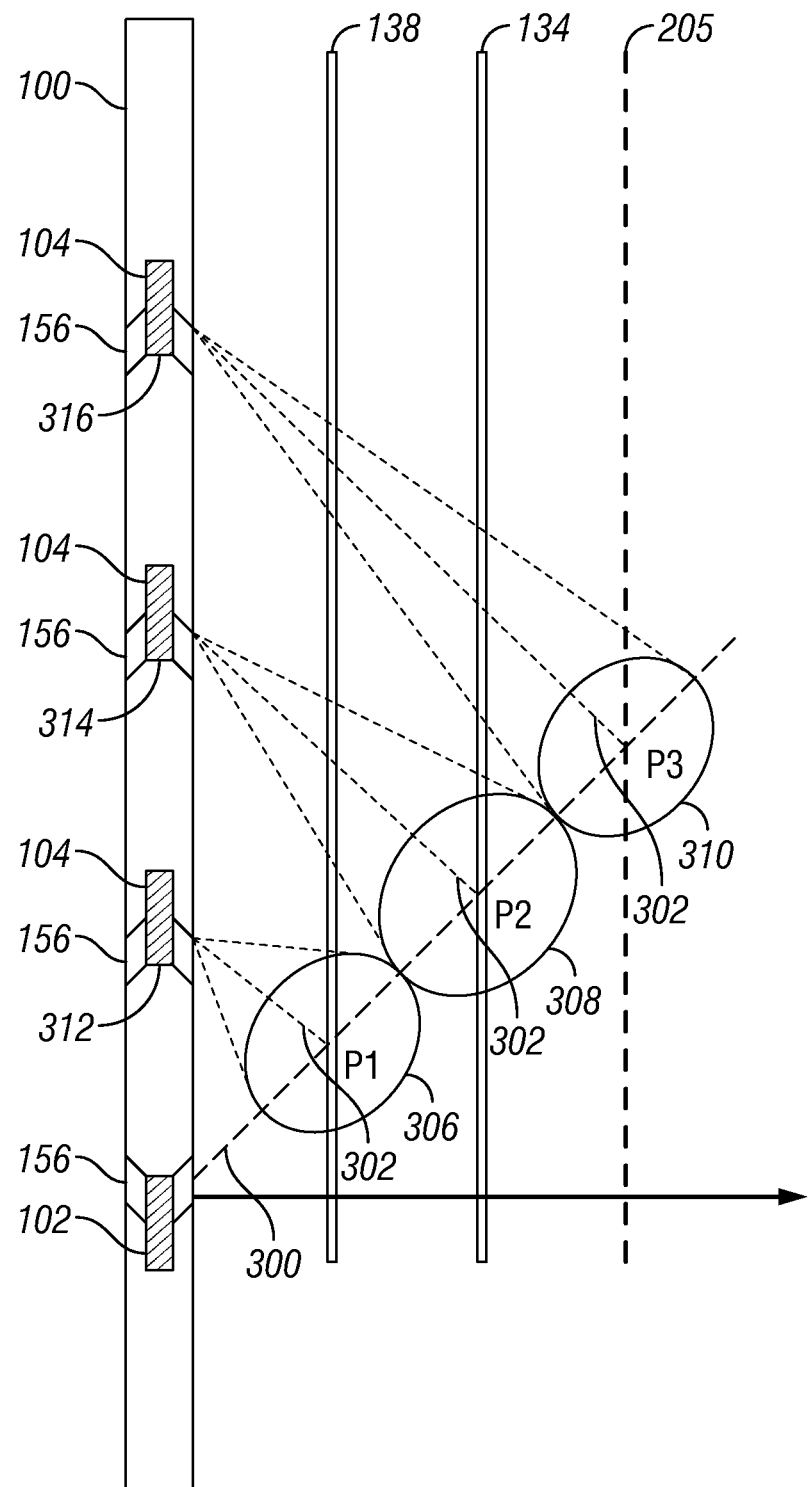
FIG. 3 illustrates an example measurement operation using the nuclear density tool.

FIG. 3 illustrates an example schematic of nuclear density tool 100 taking measurements. As illustrated, nuclear density tool 100 may measure the bulk electron density of the surrounding material based on a number of deflected gammas, which is deflected energy 300, detected by one or more gamma detectors 104 from a gamma source 102, in examples gamma source may be any radioactive source. Due to the inherent constrains of borehole environment, gamma source 102 and one or more gamma detectors 104 maybe be disposed on the same longitudinal axis through nuclear density tool 100. The amount of gamma attenuation and deflection is directly proportional to the compactness of electrons in the surrounding material. The penetration depth of the gamma rays determines the sampling range of nuclear density tool 100.

Nuclear density tool 100 in FIG. 3 may be manufactured with a source-to-detector configuration to enhance the spectral sensitivities to multiple layers. Utilizing a multiple Compton scattering scheme of high-energy photons, cut outs 156 may be utilized to focus the primary Compton scattering angles at any suitable angle. Isolated behavior of a high-energy photon in matter is described with Compton scattering, photoelectric absorption, and pair production.

With continued reference to FIG. 3, measurement operations may utilize a single Compton scattering approximation to determine initial source-to-detector distances. Source-to-detector distances is defined as the length of travel of energy 300 from gamma source 102 to first layer 306, second layer 308, third layer 310, or any identified layer, where energy 300 is reflected, and to gamma detector 104. For example, gamma source 102 and one or more gamma detectors 104 collimation minimizes the complex behavior of gamma attenuation via multiple scattering. As illustrated, one or more cut outs 156 allow for gamma source 102 and each gamma detector 104 to "see" in at a specific angle and direction. During measurement operations, gamma source 102 may emit energy 300 out of nuclear density tool 100 through a cut out 156. Likewise, gamma detectors 104 may sense and/or detect reflected energy 302 at specific angles and directions from cut out 156. This may allow for a designated area to be measured by a specific gamma detector 104 or a combination of gamma detectors 104. For example, as illustrated in FIG. 3, designated areas may be divided into a first layer 306, a second layer 308, and a third layer 310. Each layer may be sensed specifically by a single specific gamma detector 104 or a combination of gamma detectors 104. To determine the angle for cut out 156 to view each layer by gamma detector 104 is based on nuclear density tool 100 set up and the number of layers being investigate. Table 1 below is an example of determining angles for a Cs-137 source with 662 keV initial energy:

TABLE 1

| Scattering Angle | Resulting Gamma Energy, keV |
|---|---|
| 60°-80° | 320-402 |
| 80°-100° | 263-320 |
| 100°-120° | 225-263 |
| >120° | 150-225 |
| Multiple Scattering | 50-150 |
| Absorption | 0-50 |

With continued reference to FIG. 3, one or more gamma detectors 104 and a gamma source 102 may be used to determine volumetric densities of three layers. Housing 154 may determine the size of gamma detectors 104, especially the diameters of crystals used within each gamma detector 104. Additionally, source-to-detector distances are mainly determined by the desired depth-of-investigation to satisfy the required variations of borehole environment. Depth of Investigation (DOI) is the maximum penetration depth of gamma particles from gamma source 102. DOI is defined as the distance where the intensity from gamma source 102 drops to 5% of initial source intensity by total attenuation. Thus, DOI increases when source gamma energy increase. Additionally, DOI is an inverse function of bulk electron density. For example, when the average density of borehole is 2 g/cc, DOI is about 7 inches (18 centimeters). DOI determines how far gamma detectors 104 may "see" or sense.

To determine the source-to-detector distance, count rates from multiple energy channels from each gamma detector 104 may be used. Each gamma detector 104 detects deflected gamma particles from gamma source 102. When a deflected gamma particle enters detector 104, it is recorded as one count. Gamma detector 104 measures the signal in a "count rate" which is defined as total counts of deflected gamma particles to enter gamma detector 104 in one second. A preset calculation algorithm takes these count rates and calculates three layer densities for first layer 306, a second layer 308, and a third layer 310. When the source-to-detector distances are optimized for each layers of interest, there exists a macroscopic tool behavior or response function that is mainly corresponds to the bulk densities of the surrounding layers. Adopting the inverse function extrapolation from the Lambert W-function, layer densities may be expressed mathematically using a macroscopic matrix expression:

$$\bar{\rho} = \bar{A} * \overline{W_A}(CR) \quad (1)$$

where $\rho$ is the density matrix, A is the tool macroscopic behavior matrix (coefficient matrix from Monte Carlo N-Particle (MCNP) characterization), and $W_A(CR)$ is the Lambert W-function (LWF) of count rates from three gamma detectors 104, expressed below:

$$\bar{\rho} = \begin{bmatrix} \rho_1 \\ \rho_2 \\ \rho_3 \\ \vdots \end{bmatrix}, \bar{A} = \begin{bmatrix} a_{10} & a_{11} & a_{12} & a_{13} \\ a_{20} & a_{21} & a_{22} & a_{23} & \cdots \\ a_{30} & a_{31} & a_{32} & a_{33} \end{bmatrix}, \overline{W_A}(CR) = \begin{bmatrix} 1 \\ W(CR_1) \\ W(CR_2) \\ W(CR_3) \\ \vdots \end{bmatrix} \quad (2)$$

From Equation (2), CR is the total count rate, combining channel 1 through 4, integrating all scattering angles from Table 1 from 150 keV up to 402 keV. MCNP characterization is performed to construct density function from independent variables such as raw count rates. Specifically, MCNP may be used for neutron, photon, electron, or coupled neutron, photon, or electron transport. Specific areas of application include, but are not limited to, radiation protection and dosimetry, radiation shielding, radiography, medical physics, nuclear criticality safety, detector design and analysis, nuclear oil well logging, accelerator target design, fission and fusion reactor design, decontamination, and/or decommissioning. The code treats an arbitrary three-dimensional configuration of materials in geometric cells bounded by first- and second-degree surfaces and fourth-degree elliptical tori.

Table 2, as seen below, demonstrates the use of Equation (2) for nuclear density tool 100 in FIG. 3. In Table 2, the applicability of the analytical expression is demonstrated by R-squared values that only slightly differ from unity. The bottom row of Table 2 shows the standard deviation of the error in the predicted density over a broad range of environmental conditions. The magnitude of the error in first layer 306 and second layer 308 is better than the accuracy of current nuclear density tools.

TABLE 2

|  | Layer 1 | Layer 2 | Layer 3 |
|---|---|---|---|
| $R^2$ | 0.999 | 0.995 | 0.913 |
| σ, g/cc | 0.001 | 0.020 | 0.201 |

Figure 4:
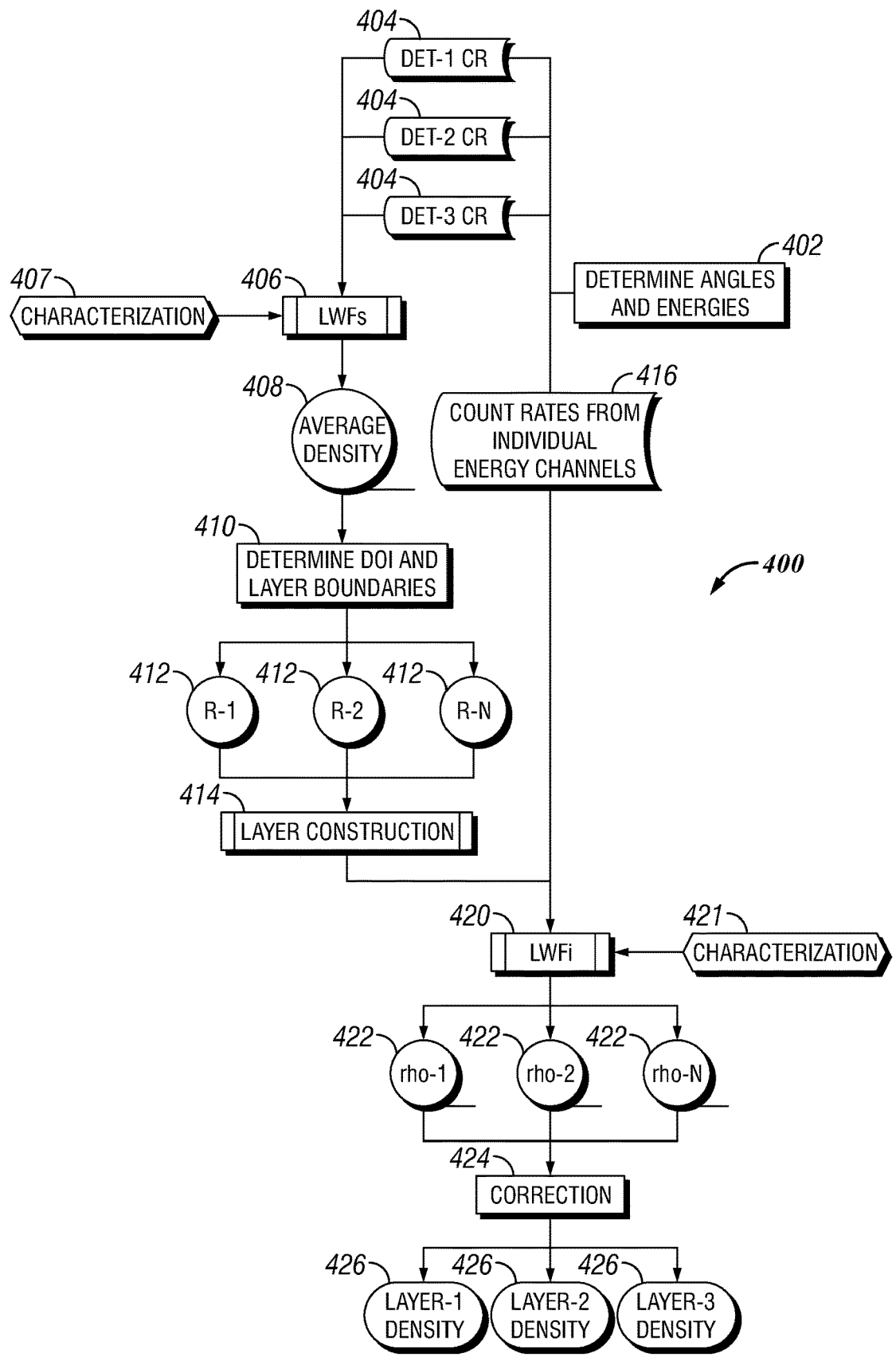
FIG. 4 is an example workflow for determining a density of an identified layer by the nuclear density tool.

FIG. 4 illustrates an example workflow 400 for determining a density of an identified layer by nuclear density tool 100 (e.g., referring to FIGS. 1 and 3). Workflow 400 may begin with block 402. In block 402, angles and energies are determined using Table 1 above. Specifically, angles for cut out 156 in housing 154 (e.g., referring to FIG. 1) and energy transmitted by gamma source 102 (e.g., referring to FIG. 1). After determining angles and energy, measurement operations may begin. For example, in block 404 count rates at each gamma detector 102 are taken. To take count rates, gamma source 102 transmits one or more energy burst from nuclear density tool 100. Each magnitude for each of the energy burst may be controlled by information handling system 144 (e.g., referring to FIG. 1). In block 406, LWFs, are pre-determined algorithms that takes a total sum count rates from each gamma detector 104 and computes a single average density from gamma source 102 to the DOI. To perform the calculation for LWFs, a characterization from block 407 is added to the LWF's in block 406. Each LWF has coefficient matrix A as shown in Equation (2). This coefficient is determined by "characterization". Characterization may be performed by MCNP computer simulations where the exact geometries of nuclear density tool 100 and borehole 204 are modeled with detailed physics to determine the A coefficients. Characterization may also be performed by lab experiments where nuclear density tool 100 is disposed in well-known borehole fixtures to calibrate responses from nuclear density tool 100. From the computation in block 406, in block 408, an average density if formed. The average density is a single average bulk density without differentiating between possible layers that have been averaged.

In block 410, the average bulk density from block 408 is used to determine the depth of investigation and desired layer boundaries. For example, if this average density is calculated to be 2 g/cc, then DOI is calculated, as discussed above, to be 7 inches (18 centimeters). Then this DOI of 7" may be cut into three layers (or n layers). As noted above, DOI is the penetration depth where the source intensity drops by 95%. For example, if the intensity drop to be 45% in layer-1, and 40% in layer-2, and 10% in layer-3, then the radius of each layer boundary may be determined. This is illustrated in blocks 412, where each layer boundary is determined. From block 412, each identified layer boundary is formed together to form a layer construction in block 414.

In block 416 count rates from individual energy channels are determine with primary scattering angles found in block 402 and are compared to the layer construction from block 414 in block 420. Block 420 utilizes Equation (2) to determine multiple calculated densities that correspond to the layers of interest. Specifically, utilizing a Lambert W-function, Equation (2) for individual energy channels, identified at "LWFi." (i in LWFi comes from individual). Individual energy channels from multiple gamma detectors 104 are utzed with the LWFi to calculate multiple layer densities. To perform the calculation for a LWFi, a characterization from block 421 is added to the each LWFi in block 420. The characterization is performed as discussed above.

Blocks 422 are layer densities determine for each layer utilizing LWFi in block 420 that have been characterized from block 421. In block 424, environmental corrections is made to determine the layer densities in block 426. Environmental corrections may be made based on known borehole conditions. In examples, environmental corrections adjusts the calculated density based on the borehole conditions and their deviations from the characterization conditions. These corrections may also be based on other complementary physical measurements such as acoustic, electric, and seismic measurements. Additionally, in block 422 raw densities may be calculated from artificial, user-defined layer boundaries. Any information regarding borehole conditions may be used to correct these raw densities to actual physical densities of the physical layers. Information such as borehole fluid type, mono-string or multi-string, casing thickness, formation type may all be considered so that final densities in block 426 reflect actual physical properties.

Workflow 400 may be applied to any tool design of nuclear density tool 100 with two or more gamma detectors 104. Thus, if there are N detectors, it is possible to isolate N layer densities. Additionally, workflow 400 may be applied in cased-hole or open-hole environments. The geometry of the hardware would be modified to match the application, with the detector spacing and collimation optimized to probe the layer(s) of interest.

Current nuclear density tools measure the bulk electron density of the surrounding material based on the number of deflected gammas from a radioactive source. Due to the inherent constrains of borehole environment, the radioactive sources and the detectors are located on the same axis. The amount of gamma attenuation and deflection is directly proportional to the compactness of electrons in the surrounding material. The penetration depth of the gamma rays determines the sampling range of the tool. Due to this fundamental physics, existing nuclear density tools offer a mature and robust technology to measure material density in downhole environment. However, existing nuclear density tools and calculation algorithms are designed to extract only a bulk density of the surrounding material averaging over the sampling range/thickness, therefore, lacking the ability to resolve any intrinsic differences in individual annular layers within that volume. The system and methods described above use a combination of radioactive gamma sources and multiple gamma detectors to measure densities of multiple annular layers. The tool is designed with an optimized source-to-detector configuration to enhance the spectral sensitivities to multiple layers. A unique analytical method is developed based on the multiple Compton scattering scheme of high-energy photons. The methodology and algorithm is developed using specific energy windows representing the primary Compton scattering angles. In this method, detector count rate is a combined function of multiple layer densities. An inverse function of detector count rate was found to resolve layer densities using multiple energy windows from multiple detectors. The systems and methods may include any of the various features of the systems and methods disclosed herein, including one or more of the following statements.

Statement 1. A nuclear density tool may comprise a gamma source, a gamma detector, wherein the gamma detector and the gamma source are disposed on a longitudinal axis of the nuclear density tool, and a housing, wherein the gamma source and the gamma detector are disposed in the housing. The nuclear density tool may further comprise a first cutout in the housing positioned to allow the gamma source to emit an energy through the housing and a second cutout in the housing posited to allow the gamma detector to detect the energy through the housing.

Statement 2. The nuclear density tool of statement 1, wherein the first cutout is at an angle with respect to the gamma source to determine a first layer.

Statement 3. The nuclear density tool of statement 2, wherein the second cutout is at a second angle with respect to the gamma detector to determine the first layer.

Statement 4. The nuclear density tool of statement 3, wherein the angle is based at least in part on a source-to-detector distance.

Statement 5. The nuclear density tool of statement 4, wherein the source-to detector distance is based at least in part on a depth-of-investigation.

Statement 6. The nuclear density tool of statement 5, wherein the depth-of-investigation is based on a density of the first layer.

Statement 7. The nuclear density tool of statements 1 or 2, wherein the energy comprises one or more energy channels.

Statement 8. The nuclear density tool of statement 7, wherein the gamma source transmits across each of the one or more energy channels.

Statement 9. The nuclear density tool of statements 1, 2, or 7, further comprising two or more gamma detectors.

Statement 10. The nuclear density tool of statement 9, wherein each of the two or more gamma detectors have a cutout.

Statement 11. A method for determining a density may comprise disposing a nuclear density tool into a wellbore. The nuclear density tool may comprise a gamma source and a gamma detector, wherein the gamma detector and the gamma source are disposed on a longitudinal axis of the nuclear density tool. The method may further comprise transmitting an energy from the gamma source, detecting the energy reflected with the gamma detector, recording a count rate of the energy at the gamma detector, determining an average density based at least in part on the count rate, creating one or more layers from the average density, forming a layer construction using at least in part the one or more layers from the average density, comparing the layer construction to count rates form individual energy channels, and determining a final layer density for each of the one or more layers.

Statement 12. The method of statement 11, wherein a Lambert W-function (LWF) is used to determine the average density.

Statement 13. The method of statement 12, wherein the Lambert W-function is characterized for the nuclear density tool.

Statement 14. The method of statements 11 or 12, wherein an individual Lambert W-function (LWFi) for each of the one or more layers.

Statement 15. The method of statement 14, wherein the LWFi is characterized for the nuclear density tool.

Statement 16. The method of statements 11, 12, or 14, further comprising performing an environmental correction on the final layer density for each of the one or more layers.

Statement 17. The method of statement 16, wherein the environmental correction comprises at least complementary physical measurements such as acoustic, electric, or seismic measurements.

Statement 18. The method of statements 11, 12, 14, or 16, further comprising dividing the average density into one or more layers based at least in part on a depth of investigation.

Statement 19. The method of statement 18, the depth of investigation is an intensity from the energy emitted by the gamma source drops to 5% of an initial source intensity.

Statement 20. The method of statements 11, 12, 14, 16, or 18, wherein the nuclear density tool further comprises:
a housing, wherein the gamma source and the gamma detector are disposed in the housing;
a first cutout in the housing positioned to allow the gamma source to emit an energy through the housing; and
a second cutout in the housing posited to allow the gamma detector to detect the energy through the housing.

Although the present disclosure and its advantages have been described in detail, it should be understood that various changes, substitutions, and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A nuclear density tool comprising:
a gamma source;
a first gamma detector;
a second gamma detector, wherein the first gamma detector, the second gamma detector, and the gamma source are disposed on a longitudinal axis of the nuclear density tool;
a housing, wherein the gamma source the first gamma detector, and the second gamma detector are disposed in the housing;
a first cutout in the housing positioned to allow the gamma source to emit an energy through the housing;
a second cutout in the housing positioned to allow the first gamma detector to detect the energy through the housing from at least a first layer of one or more layers; and
a third cutout in the housing positioned to allow the second gamma detector to detect the energy through the housing from a second layer of the one or more layers.

2. The nuclear density tool of claim 1, wherein the first cutout is at an angle with respect to the gamma source to determine a first layer of the one or more layers.

3. The nuclear density tool of claim 1, wherein the positioning of the cutouts is based at least in part on a source-to-detector distance.

4. The nuclear density tool of claim 3, wherein the source-to detector distance is based at least in part on a desired depth-of-investigation.

5. The nuclear density tool of claim 4, wherein the desired depth-of-investigation is based on a density of the first layer.

6. The nuclear density tool of claim 1, wherein the energy comprises one or more energy channels.

7. The nuclear density tool of claim 6, wherein the gamma source transmits across each of the one or more energy channels.

8. The nuclear density tool of claim 1, further comprising two or more gamma detectors.

9. The nuclear density tool of claim 8, wherein each of the two or more gamma detectors have a cutout.

10. A method for determining a density comprising:
    disposing a nuclear density tool into a wellbore, wherein the nuclear density tool comprises:
        a gamma source; and
        a gamma detector, wherein the gamma detector and the gamma source are disposed on a longitudinal axis of the nuclear density tool;
    transmitting an energy from the gamma source;
    detecting the reflected energy with the gamma detector;
    recording a count rate of the energy at the gamma detector;
    determining an average density based at least in part on the count rate;
    dividing the average density into one or more layers;
    forming a layer construction using at least in part the one or more layers from the average density;
    comparing the layer construction to count rates from individual energy channels; and
    determining a final layer density for each of the one or more layers.

11. The method of claim 10, wherein a Lambert W-function (LWF) is used to determine the average density.

12. The method of claim 11, wherein the Lambert W-function is characterized for the nuclear density tool.

13. The method of claim 10, wherein an individual Lambert W-function (LWFi) for each of the one or more layers.

14. The method of claim 13, wherein the LWFi is characterized for the nuclear density tool.

15. The method of claim 10, further comprising performing an environmental correction on the final layer density for each of the one or more layers.

16. The method of claim 15, wherein the environmental correction comprises at least complementary physical measurements such as acoustic, electric, or seismic measurements.

17. The method of claim 10, wherein dividing the average density into one or more layers is based at least in part on a depth of investigation.

18. The method of claim 17, the depth of investigation is an intensity from the energy emitted by the gamma source drops to 5% of an initial source intensity.

19. The method of claim 10, wherein the nuclear density tool further comprises:
    a housing, wherein the gamma source and the gamma detector are disposed in the housing;
    a first cutout in the housing positioned to allow the gamma source to emit an energy through the housing; and
    a second cutout in the housing positioned to allow the gamma detector to detect the energy through the housing.

20. The method of claim 10, further comprising resolving the one or more layers with an inverse function of detector count rate.

* * * * *